Figure 1:
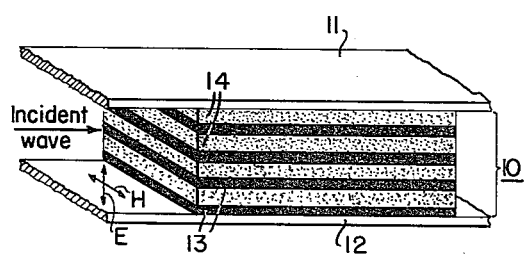

May 23, 1950

H. A. WHEELER 2,508,479

HIGH-FREQUENCY ELECTROMAGNETIC-WAVE
TRANSLATING ARRANGEMENT

Filed Nov. 16, 1944

2 Sheets-Sheet 1

*INVENTOR.*
HAROLD A. WHEELER
BY
*ATTORNEY*

May 23, 1950  H. A. WHEELER  2,508,479
HIGH-FREQUENCY ELECTROMAGNETIC-WAVE
TRANSLATING ARRANGEMENT
Filed Nov. 16, 1944  2 Sheets-Sheet 2

Laminations parellel to plane of cross section

Laminations parellel to plane of cross section

INVENTOR.
HAROLD A. WHEELER
BY Harry C. Page
ATTORNEY

Patented May 23, 1950

2,508,479

UNITED STATES PATENT OFFICE 2,508,479

HIGH-FREQUENCY ELECTROMAGNETIC-WAVE TRANSLATING ARRANGEMENT

Harold A. Wheeler, Great Neck, N. Y., assignor, by mesne assignments, to Hazeltine Research, Inc., Chicago, Ill., a corporation of Illinois Application November 16, 1944, Serial No. 563,716

23 Claims. (Cl. 178—44)

The present invention relates to electromagnetic-wave translating arrangements and, particularly, to such arrangements for propagating or aiding in the propagation of high-frequency electromagnetic waves along a restricted path, which path may be linear or nonlinear as desired.

A transmission line, having two conductors supported in insulated spaced relation, is widely used as a wave-signal propagating arrangement for propagating an electromagnetic wave between given spaced points. The electromagnetic wave follows, or is guided along, the conductors and travels with the speed of light if the conductors are surrounded only by air dielectric. In one form of transmission line of this nature, one of the conductors is enclosed within the other to form a "shielded" transmission line, whereby the propagation of the electromagnetic wave is along a restricted path enclosed by the outer conductor. A particular form of such transmission line is one having conductors of circular cross section supported in concentric relation to provide a "coaxial" transmission line. The extensive utility and advantages of these forms of transmission line are well known to persons skilled in the art.

In one form of transmission line of the type described, insulating spacers are positioned along the line to maintain the conductors in uniform spaced relationship and electrically insulated from each other. The spacers heretofore employed for this purpose increase the capacitance of the line in the region occupied by the spacers. This has the effect of changing the characteristic impedance of the line in this region and an electrical impedance discontinuity is thus produced on the line at each of the spacers. A point of "discontinuity" is said to occur when reflection of wave-signal energy occurs at that point. Discontinuities of this nature have increasingly serious effect as the frequency of the translated wave signal becomes increasingly higher since the length of each such discontinuity longitudinally of the line then becomes a larger fraction of a wave length of the wave signal. The undesirable effect of such reflections of wave-signal energy arises from the fact that they produce standing waves of voltage and current along the line and thus reduce the power translated to a wave-signal translating device coupled to the remote end of the line.

To avoid the change of line impedance produced by such spacers, it has been proposed that the cross-sectional sizes of the transmission-line conductors be modified over the length of the spacers to maintain substantially constant the characteristic impedance of the line throughout its length. Alternately, it has been proposed that the spacers have a longitudinal length critically related to the frequency of the propagated wave signal in order that the wave-signal energy reflected by the two surfaces of the spacer in the path of wave-signal propagation shall have opposing phase relationship, thus to nullify the effect along the line of the reflected energy. This, of course, limits the usefulness of the line in that it can propagate a wave signal of only one frequency if standing waves are to be avoided.

Yet another arrangement which effects propagation of electromagnetic waves along a closed restricted path is the so-called "wave guide." A wave guide may be essentially a hollow conductor having internal dimensions critically related to the wave length of an electromagnetic wave to be propagated thereby. An electromagnetic wave of the proper wave length, once started on its way down the interior of the wave guide, will continue traveling therealong and will follow the wave guide whether the latter is linear or contains gradual bends along its length. The propagation of wave-signal energy in a straight wave guide is free of reflections and this is approximately true for any gradual bends occurring therein. Sharp bends in the wave guide, on the other hand, are highly undesirable since they may form a severe discontinuity with consequent distortion of the electromagnetic-wave front and consequent appreciable reflection of wave-signal energy. It is frequently desirable to provide such sharp bends in wave guides, but their attendant disadvantages have heretofore greatly restricted and minimized their use, thus to place an undue limitation on the usefulness of wave guides in practice.

In certain applications, it is desirable that electromagnetic waves be propagated over a restricted path without boundaries, as a beam similar to a beam of light. This has been accomplished in accordance with one prior arrangement by the use of suitably shaped wave-signal reflectors properly positioned with relation to an electromagnetic-wave radiating element. In addition to or in lieu of such reflectors, dielectric lens elements have been employed to facilitate focusing the electromagnetic-wave energy into a beam of desired configuration. Lens elements of this nature have heretofore been comprised simply of a dielectric material, for example polymerized styrene. While such lenses usually are operative to effect the desired focusing action, their impedance to the propagation of electromagnetic waves is different from that of the free-space wave-signal propagation path immediately preceding and following the lens element with the result that undesired reflections of wave-signal energy occur at the surfaces of the lens element. This not only results in undesirable loss of wave-signal energy in the desired path, but has the additional disadvantage that such energy is propagated in many undesired directions unless additional means is employed to absorb, or otherwise to prevent, the reflected wave-signal energy from traveling in such undesired directions.

In a particular form of transmission-line arrangement, primarily useful for communication circuits laid under a river or under the sea, an insulated conductor is enclosed in coaxial relation within a protective sheath or shield of conductive material and is loaded by a continuous spiral winding of iron ribbon applied directly over the inner conductor. The magnetic loading of the line in this manner is primarily for the purpose of increasing its characteristic impedance and thereby reducing attenuation and phase distortion over a band of frequency components of a very low-frequency electromagnetic wave to be propagated. The object has been to secure as high effective permeability as possible, regardless of the dielectric constant of the cable insulation, by the use of special magnetic materials having high-permeability magnetic alloys containing materials such as nickel, iron, etc., such as that sold under the trade name "Permalloy."

It is an object of the present invention to provide a new and improved high-frequency electromagnetic-wave translating arrangement which avoids one or more of the limitations and disadvantages of prior arrangements of the type described.

It is a further object of the invention to provide a new and improved high-frequency electromagnetic-wave translating arrangement having high efficiency of wave propagation and one which is characterized by minimum reflection of any wave-signal energy in the path of wave-signal propagation therethrough.

It is an additional object of the invention to provide an improved high-frequency electromagnetic-wave translating element providing therein a wave-signal propagation path of which portions thereof effect propagation of wave signals with different velocities and yet one in which the change of wave-signal velocity from one such portion to another is not accompanied by any change of impedance throughout the wave-signal propagation path.

In accordance with the invention, a high-frequency electromagnetic-wave translating arrangement comprises a wave-signal propagating device adapted to effect propagation of high-frequency electromagnetic waves along a predetermined propagation path of which at least a portion of the propagation medium thereof has a predetermined ratio of dielectric constant to magnetic permeability. The arrangement includes an electromagnetic-wave propagating element interposed in the aforesaid portion of the propagation path to modify the velocity of wave-signal propagation therethrough. The last-mentioned element includes dielectric and magnetic materials individually having a substantially different dielectric constant and a substantially different magnetic permeability than the medium of the path but combined in quantities so proportioned with relation to their dielectric constants and magnetic permeabilities as to provide, for a predetermined mode of wave-signal propagation therethrough and along the aforesaid portion of the propagation path, a ratio of effective dielectric constant to effective magnetic permeability for the element substantially equal to the aforesaid predetermined ratio.

The high-frequency electromagnetic-wave translating arrangement of the present invention is related to the translating element of applicant's copending application entitled High-frequency electromagnetic-wave translating element, Serial No. 563,715, filed November 16, 1944, and assigned to the same assignee as the present application. The translating element of the copending application comprises dielectric and magnetic materials combined in quantities so proportioned with relation to their dielectric constants and magnetic permeabilities as to provide for the element, and for a predetermined mode of wave-signal propagation therethrough, a desired ratio of effective dielectric constant to effective magnetic permeability.

For a better understanding of the present invention, together with other and further objects thereof, reference is had to the following description taken in connection with the accompanying drawings, and its scope will be pointed out in the appended claims.

Figure 1A:
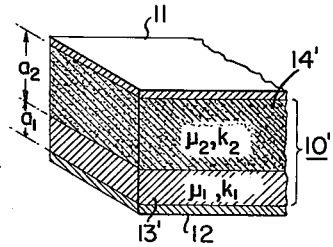
Figure 2:
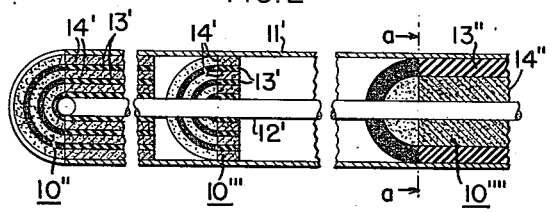
Figure 2A:
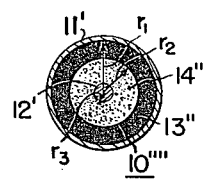
Figure 4:
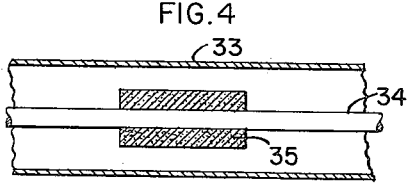
Figure 5A:
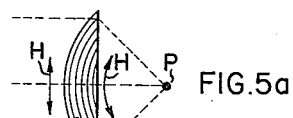
Figure 5B:
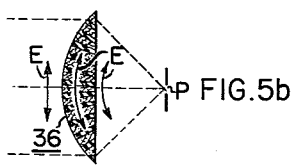
Figure 6A:
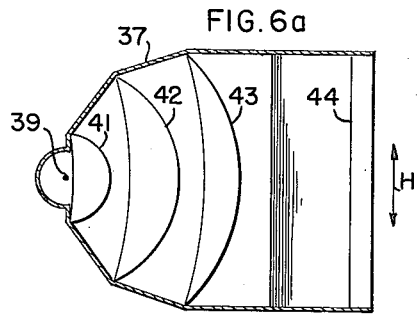
Figure 6B:
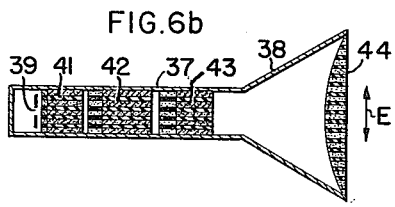
Figure 7A:
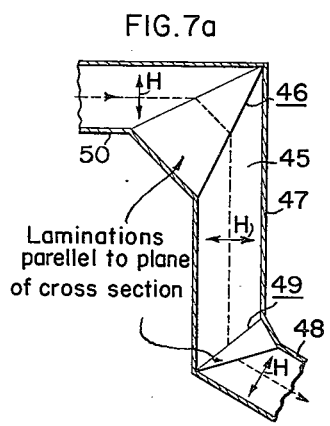
Figure 7B:
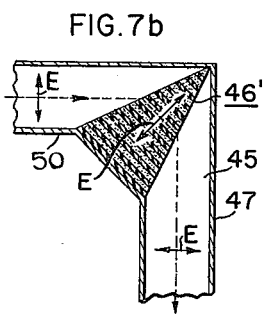

Referring now to the drawings, Fig. 1 illustrates a high-frequency electromagnetic-wave translating arrangement embodying the present invention in a particular form; Fig. 1a illustrates a form of translating arrangement similar to that of Fig. 1 and is used as an aid in explaining the proper proportioning of certain materials thereof; Fig. 2 illustrates modified forms of the invention as embodied in wave-signal translating arrangements of the coaxial transmission-line type; Fig. 2a represents a cross-sectional view of the Fig. 2 arrangement taken along the cross-sectional plane a—a; Figs. 3a to 3d and 4 illustrate cross-sectional views of several translating arrangements of the coaxial transmission-line type which embody the present invention in additional modified forms; Figs. 5a and 5b illustrate top and side views of an embodiment of the invention for effecting translation of a wave signal over a restricted path without boundaries, as a beam similar to a beam of light; Figs. 6a and 6b illustrate a top view and a longitudinal sectional view, respectively, of a wave-signal translating arrangement of the wave-signal horn-radiator type; and Figs. 7a and 7b illustrate wave-signal translating arrangements embodying the invention in the form of wave guides having relatively sharp-angled turns therein to change the direction of wave-signal propagation through the wave guides.

Referring now more particularly to Fig. 1 of the drawings, there is illustrated a high-frequency electromagnetic-wave translating arrangement embodying the present invention in a particular form. By the term "high frequency," as used in the present specification and claims, is meant a frequency sufficiently high that the maximum dimension of a given wave-signal propagation path normal to the direction of wave-signal propagation through the path is an appreciable fraction of a wave length of the propagated electromagnetic wave, for example $1/1000$ wave length or larger fraction. This arrangement includes a wave-signal propagating device, shown as a two-conductor balanced transmission line 11, 12, adapted to effect propagation of high-frequency electromagnetic waves along a predetermined propagation path between the inner conductive surfaces of the conductors 11, 12. Of this path, the portion shown in Fig. 1 has a predetermined wave-signal propagation impedance, or, expressed in another manner, a predetermined ratio of dielectric constant to magnetic permeability. The arrangement also includes an electromagnetic-wave translating element 10 interposed in the aforementioned portion of the propagation path, between the conductors 11, 12, to modify the velocity of wave-signal propagation therethrough. The element 10 is suitably secured to each of the conductors 11, 12 and is used to maintain the conductors in spaced relation in the arrangement shown. To illustrate the character and advantages of the present invention, it will be assumed that the translating element 10 is one of a number of similar elements spaced along the transmission line, each such element having a length longitudinally of the line which is short with relation to the line length, and that the line otherwise uses air dielectric over the length thereof not occupied by the element 10. Since air by definition has a dielectric constant $k$ equal to the unity and a magnetic permeability $\mu$ also equal to unity, the impedance of those portions of the line which use air dielectric has a value equal to $$\sqrt{\mu/k} \text{ or unity}$$

Any changes of characteristic impedance along the line produce impedance discontinuities therein and cause at each such point of discontinuity undesirable reflections of wave-signal energy. A dielectric material has unity relative magnetic permeability but a dielectric constant greater than unity. Hence, the use of dielectric material alone between the line conductors produces a change of line impedance, assuming no change of conductor cross section or spacing, since $$\sqrt{\mu/k}$$

for a dielectric material is not equal to unity. The use of short lengths of dielectric material in a transmission line otherwise employing air as a dielectric consequently results in impedance discontinuities along the length of the line which may cause serious reflections of wave-signal energy when the latter is of relatively high frequency.

In accordance with the present invention, the translating element 10 while utilizing dielectric material nevertheless is made to have a desired ratio of $\mu$ to $k$ which, under the assumed conditions, is equal to unity. This is accomplished by forming the translating element 10 of layers or laminations alternately of dielectric material 13 and magnetic material 14, the maximum lamination thickness being much less than one radian length of the highest-frequency electromagnetic wave to be translated. The magnetic material 14 preferably comprises particles of magnetic material, for example comminuted or powdered iron dust, dispersed or held in solid suspension in a dielectric material to provide a homogeneous magnetic material having the particles of magnetic material individually insulated from each other. The dielectric constant of the magnetic material 14 will, of course, be higher than that of the dielectric material used therein due to the conductivity of its magnetic particles. The magnetic material 14 thus has a predetermined value of magnetic permeability and a predetermined value of dielectric constant. The dielectric material 13, on the other hand, has unity magnetic permeability and a dielectric constant greater than unity. In accordance with the invention, the dielectric and magnetic materials of the translating element 10 are combined in quantities so proportioned with relation to their dielectric constants and magnetic permeabilities as to provide, for a predetermined mode of wave-signal propagation therethrough, a ratio of effective dielectric constant to effective magnetic permeability for the element 10 substantially equal to the ratio of the dielectric constant to magnetic permeability for the propagation path between the conductors 11, 12 but outside of the element 10.

The required mode of wave-signal propagation for the laminated construction of Fig. 1 is indicated by the arrows associated with the figure. Thus, the direction of electromagnetic-wave propagation is parallel to the laminations of the element 10, the wave having such polarity or mode of propagation that its magnetic field is normal to its direction of propagation but parallel to the laminations of magnetic material 14, as indicated by the arrow H, while its electric field is normal to the laminations as indicated by the arrow E.

The proportioning of the dielectric and magnetic materials of the translating element 10 will now be considered in greater detail with reference to Fig. 1a wherein the translating element 10' is shown as formed of a dielectric material 13' having a thickness $a_1$ with magnetic permeability $\mu_1$ and dielectric constant $k_1$, and a magnetic material 14' having a thickness $a_2$ with magnetic permeability $\mu_2$ and dielectric constant $k_2$. While the translating element 10' is shown as having only two layers of dielectric and magnetic materials, it will be understood that both the dielectric and magnetic materials may be further laminated if desired, as in Fig. 1, but that in any event the thicknesses $a_1$ and $a_2$ thereof are considered as representing the sum total of the thicknesses of all such laminations or layers. It can be shown that, for any desired ratio of effective magnetic permeability to effective dielectric constant of the translating element 10', the thickness $a_1$ of the dielectric material is given by the following relation:

$$a_1 = \frac{2k_1\,(R^2k_2-\mu_2)}{\mu_2 M - k_1 N \pm \sqrt{(\mu_2 M - k_1 N)^2 - 4k_1 MN(R^2 k_2 - \mu_2)}} \quad (1)$$

or $$a_1 = \frac{\mu_2 M - k_1 N \pm \sqrt{(\mu_2 M - k_1 N)^2 - 4k_1 MN(R^2 k_2 - \mu_2)}}{2MN} \quad (1A)$$

where $M = k_2 - k_1$
$N = \mu_2 - \mu_1$
$a_2 = 1 - a_1$ $$R = \sqrt{\frac{\mu'}{k'}}$$

$\mu'$ = effective magnetic permeability of element 10'
$k'$ = effective dielectric constant of element 10'

It is apparent that $a_1$ has from Equation 1 or 1A two values. For greatest accuracy of calculation, Equation 1 should be used with the positive sign before the radical for the smaller value of $a_1$ and Equation 1A should be used with the positive sign before the radical for the larger value of $a_1$. Values of $a_1$ greater than unity or negative denote a structure which cannot be physically constructed.

Inspection of Equations 1 and 1A shows that when R becomes large enough, the radical term becomes imaginary. It is apparent that the maximum value which R can have in a physical embodiment of the invention is one which causes the radical term of either of these equations to equal zero. Consequently, it can be shown that for any given set of values of $k_1$, $k_2$, $\mu_1$ and $\mu_2$, this maximum value which R may have is given by the relation:

$$R^2_{max.} = \frac{\mu_2^2 M}{4k_1 k_2 N} + \frac{k_1 N}{4k_2 M} + \frac{\mu_2}{2k_2} \quad (1B)$$

The effective dielectric constant of the magnetic material usually is larger than the effective magnetic permeability thereof even though the magnetic particles of the material have, as a homogeneous mass disassociated from the dielectric material, high magnetic permeability. For those applications where a low ratio of $\mu$ to $k$ is desired, it is preferable to use for the laminations of dielectric material one having a relatively low dielectric constant, for example polystyrene or Lucite foam, the latter having a dielectric constant of approximately 1.1. In fact, for low ratios of $\mu$ to $k$ the laminations of magnetic material may simply be suitably maintained in spaced relation, as by very small insulating spacers inserted therebetween, so that the space between the laminations of magnetic material comprises largely air dielectric. This makes the dielectric constant of the substance between the magnetic laminations equal to unity.

A translating element 10 of the type having unity ratio of $\mu$ to $k$ has the same characteristic impedance as free space, but propagates an electromagnetic wave with less velocity than in free space. The reduction of wave-signal velocity effected by such translating element is greater than that effected by a dielectric material of the same volume and configuration and thus has utility, for example, in substantially increasing the effective electrical length of a transmission line with which the element is used. Of the two values of $a_1$ given by Equation 1 to 1A, that which provides the thickest layer or layers of magnetic material results in the greatest reduction of wave-signal velocity in the element 10 since the effective dielectric constant and effective magnetic permeability of the element are then both large. The value of $a_1$ which provides a thinner layer or thinner layers of magnetic material results in a larger wave-signal velocity in element 10, although this velocity is still less than that of free space, due to the smaller values of effective dielectric constant and magnetic permeability of the element.

Fig. 2 illustrates several modified forms of a high-frequency electromagnetic-wave translating arrangement embodying the present invention and of the coaxial transmission-line type. The line has an outer conductor 11' and an inner conductor 12' supported in coaxial relation by a translating element 10'' similar to that just described except that it comprises concentric cylindrical layers alternately of dielectric material 13' and magnetic material 14'. This element surrounds the inner conductor 12' and fills the entire space between the conductors 11' and 12'. The translating element may extend along the entire length of the transmission line, as where it is desired that the transmission line be of the flexible type having an outer braided conductor 11' and an inner conductor 12' formed of strands of wire, or may simply be a short spacer as shown by the element 10''' which has utility in a relatively rigid transmission line. The dielectric and magnetic materials of a translating element of the multilayered laminated concentric type, such as the elements 10'' or 10''' of Fig. 2, are proportioned in the manner described in connection with the elements 10 and 10' of Figs. 1 and 1a. An additional form of translating element 10'''', shown in Fig. 2, has a single cylindrical layer of magnetic material 14'' surrounded by a single concentric layer of dielectric material 13''. In this case, the relative total thickness of the layers of dielectric and magnetic materials as determined by the use of Equation 1 or 1A must be modified by taking into account the fact that the potential gradient between the inner and outer conductors of the transmission line varies exponentially between the conductors. Thus, referring to Fig. 2a, which represents a cross section along the plane $a$—$a$ of Fig. 2, if the outer conductor 11' has an inner radius $r_1$ and the inner conductor 12' an outer radius $r_3$, the outer radius of the magnetic material 14'', or the inner radius of the dielectrical material 13'', is given by either of the following relations:

$$\log \frac{r_1}{r_2} = a_1 \log \frac{r_1}{r_3} \quad (2)$$

$$\log \frac{r_2}{r_3} = (1 - a_1) \log \frac{r_1}{r_3} \quad (3)$$

While the translating arrangement of the present invention has heretofore been described as utilizing a translating element involving layers or laminations of dielectric and magnetic materials by which to attain a desired ratio of effective magnetic permeability to effective dielectric constant for the element, it will now be apparent that the primary purpose of the layer or layers of dielectric material is to reduce the effect of the relatively large dielectric constant of the magnetic material sufficiently to attain the desired ratio of effective magnetic permeability to effective dielectric constant. As earlier mentioned, air gaps between the layers or laminations of magnetic material are effective for this purpose in lieu of intervening layers or laminations of dielectric material. Figs. 3a to 3d illustrate several wave-signal translating arrangements embodying modified forms of the invention wherein the configuration of translating elements used in an arrangement of the coaxial transmission-line type provides air gaps by which to attain the desired ratio of effective magnetic permeability to effective dielectric constant.

Figure 3A:
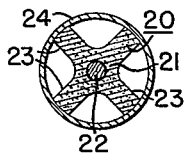

In Fig. 3a, the electromagnetic-wave translating element 20 is formed of a homogeneous mixture of dielectric and magnetic materials which preferably are proportioned in quantities so related to their dielectric constants and magnetic permeabilities as to provide as close an approximation as possible to the desired ratio of magnetic permeability to dielectric constant. In this proportioning, the individual dielectric constants and magnetic permeabilities of the two materials are regarded as those of the homogeneous materials per se. Since the effective dielectric constant of most known magnetic materials is high due to their conductivity, powdered iron having a dielectric constant of approximately infinity, a homogeneous mixture of dielectric and magnetic materials usually has an effective dielectric constant larger than its effective magnetic permeability. To reduce the effective dielectric constant of the translating element 20 of Fig. 3a, the element is constructed to have a central hub portion 21 which forms a complete magnetic path of relatively low reluctance around the inner conductor 22 of the transmission line and radial arm portions 23 which extend from the hub portion 21 to the outer conductor 24 of the transmission line. The radial thickness of the hub portion 21 and the length and circumferential thickness of the radial portions 23 of the element 20 for a unit length of the latter are proportional with relation to each other and to the magnetic permeability and dielectric constant of the homogeneous mixture of materials used therein to provide the desired ratio of effective magnetic permeability to effective dielectric constant for the element 20. With the configuration shown, it will be evident that the capacitance between the line conductors 22 and 24 is determined in large part by the dielectric constant of the radial arms 23. Since most of the electric field between the conductors 22 and 24 must traverse a relatively long air gap, the ratio of the effective magnetic permeability to effective dielectric constant for the member 20 may readily be made any value desired even though the effective dielectric constant of the homogeneous mixture of materials of element 20 is much larger than its effective magnetic permeability.

Figure 3B:
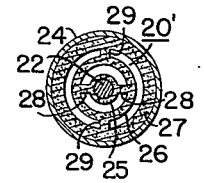

The electromagnetic-wave translating element 20' of Fig. 3b has such configuration that every electric line of force between the conductors 22 and 24 of the transmission line must traverse at least one air gap. Thus, the element 20' has three portions 25, 26 and 27 which provide closed paths for the magnetic field surrounding the inner conductor 22 of the line, but the radial arms 28, 28 which connect the portions 25 and 26 of the element are normal to the radial arms 29, 29 which connect the portions 26 and 27 of the element. Consequently, the radial thicknesses of the portions 25, 26 and 27 are selected to attain the desired ratio of effective magnetic permeability to effective dielectric constant for the element 20'.

Figure 3C:
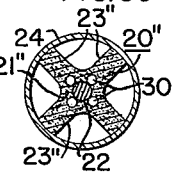
Figure 3D:
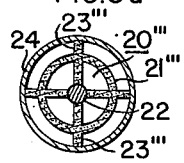

Figs. 3c and 3d illustrate configurations of the electromagnetic-wave translating element which permit some control over the effective radial thickness and length of the magnetic path provided around the inner conductor 22 of the line by the translating element. In Fig. 3c, the translating element 20'' is provided with apertures 30 in the hub portion of the element 20'' which provide air gaps in a portion of the magnetic path around the central conductor 22, thus causing the greater portion of the magnetic flux to flow through the element 20'' at a greater distance from the conductor 22. In Fig. 3d, the hub portion 21''' of the translating element 20''' is positioned at a distance from the inner conductor 22 of the transmission line, thus to increase the length of the path of lowest magnetic reluctance around the inner conductor.

It will be understood that a translating element having any of the configurations of Figs. 3a to 3d may extend longitudinally the full length of the transmission line or may simply be relatively short insulating spacers as desired.

It was previously mentioned that an electromagnetic-wave translating element having unity ratio of $\mu$ to $k$ has the same characteristic impedance as free space, but a wave-signal propagation velocity less than that of free space. It will thus be apparent that an arrangement embodying the present invention and using such a trans-lating element has utility where it is desired that a wave-signal propagation path have an effective electrical length greater than its physical length. Fig. 4, which represents an application of this nature, illustrates a coaxial transmission line 33, 34 having a cylindrical electromagnetic-wave translating element 35 supported on the inner conductor 34 thereof. The element 35 is formed of a homogeneous mixture of dielectric and magnetic materials. Assuming the line to be air filled, uniformity of impedance along the transmission line is maintained when the radial thickness $x$ of the element 35 has a value given by the relation:

$$x = \frac{\mu + \frac{1}{k} - 2}{(\mu - 1)\left(1 - \frac{1}{k}\right)} \quad (4)$$

where $\mu$ = the effective magnetic permeability of the material of element 35

$k$ = the effective dielectric constant of the material of element 35.

The length of the element 35 is selected, of course, to provide the desired effective increase of electrical length of the transmission line.

Figs. 5a and 5b illustrate top and side views of an electromagnetic-wave translating arrangement embodying the present invention. This arrangement includes a wave-signal translating element 36, having the configuration of a spherical condensing lens, which is supported by any suitable means in fixed relation to a wave-signal propagating device P shown by way of example as a dipole antenna. The element 36 is formed of laminations alternately of dielectric and magnetic materials similar to that of the element 10 of Fig. 1. In a thin spherical lens of this nature, or lens having a long focal length, parallel laminations provide a fair approximation of the desired lens action. However, it is preferable for the best lens action, especially in lens elements of short focal length, that the laminations have a wedge-shaped cross section as indicated in Fig. 5b. The proper polarity or mode of wave-signal propagation through the element 36 is indicated in Figs. 5a and 5b; namely, the magnetic field should be parallel to the laminations, as indicated by the arrow H of Fig. 5a, and the electric field should be normal to the laminations as indicated by the arrow E of Fig. 5b. It can be shown that the index of refraction $n$ of the translating element 36 is given by the relation:

$$n = C \frac{1}{\sqrt{k'\mu'}} \quad (5)$$

where $C$ = a constant $k'$ = the effective dielectric constant of the element 36

$\mu'$ = the effective magnetic permeability of the element 36.

Assuming that the wave propagation is to be through free space, the quantities of the dielectric and magnetic materials of the element 36 are proportioned to provide unity ratio of effective magnetic permeability to effective dielectric constant by use of Equation 1 or 1A so that the characteristic impedance of the element 36 is the same as that of free space. Hence, an electromagnetic wave propagated as a cylindrical beam of energy to the element 36 is concentrated by the latter to the dipole antenna P without reflection of wave energy from either surface of the element 36. Conversely, electromagnetic-wave energy radiated from the antenna P is concentrated by the element 36 into a cylindrical beam of wave-signal energy without reflection from the surfaces of the element 36.

Figs. 6a and 6b are, respectively, a top view and a longitudinal sectional view illustrating a high-frequency electromagnetic-wave translating arrangement, embodying the present invention, which is of the horn type of wave-signal radiator. The horn radiator 37, having a configuration well known to those skilled in the art, is useful in effecting the radiation of a sharply concentrated beam of wave-signal energy. The horn illustrated is of rectangular cross section with a flaring end portion 38 and utilizes a dipole antenna 39 to initiate the propagation of electromagnetic waves therethrough. Translating elements 41, 42, 43 and 44 comprising laminations of dielectric and magnetic materials have the configuration of cylindrical condensing lens elements and are used to effect proper focusing of the electromagnetic-wave energy as it propagates down the horn 37 and into free space. The orientation of the dipole antenna 39 indicated in Figs. 6a and 6b provides the required mode of wave-signal propagation through the elements 41, 42, 43 and 44; namely, with the magnetic field of the electromagnetic wave parallel to the laminations of the translating elements and with the electric field normal to the lamination thereof, as indicated, respectively, by the arrow H of Figs. 6a and the arrow E of Fig. 6b. The translating elements 41, 42, and 43 and 44 each comprise dielectric and magnetic materials combined in quantities proportioned in the manner of the translating element 10 of Fig. 1 so that the wave-signal propagation impedance is maintained uniform throughout the length of the horn 37. As a consequence, no reflection of wave-signal energy occurs at any lens surface of the translating elements, thus to avoid the development of any standing waves of voltage and current within the horn 37. Such standing waves not only increase the wave-signal losses in the horn 37, but impair the directional radiation characteristics desired of the latter.

Fig. 7a represents a cross-sectional view of a rectangular wave guide 45 embodying the present invention: The wave guide 45 includes a first portion 50 arranged at right angles to a second portion 47 and includes a portion 48 which makes an obtuse angle with the portion 47. The internal dimensions of the wave guide 45 are proportioned in well known manner to effect wave-signal propagation therethrough. The use of a right-angle turn, for example that existing between the wave-guide portions 50 and 47, has heretofore been undesirable and impractical for the reason that appreciable loss of wave-signal energy and distortion of the wave front has occurred at the turn due to severe reflection of wave-signal energy at that point. This has also been true in large part where the bend in the wave guide was less than a right angle, for example an obtuse angle such as that between the wave-guide portions 47 and 48. To avoid such reflections in the present arrangement, a laminated translating element 46, having the configuration of a prism, is positioned at the juncture of the wave-guide sections 50, 47 to effect a 90-degree change in the direction of wave-signal propagation. This is accomplished without any reflection of wave-signal energy from either surface of the translating element 46. As a result, an electromagnetic wave propagates down the wave guide without loss of wave-signal energy and in the same manner as though the wave guide were linear. The use of a second laminated translating element 49 of prismatic configuration effects a similar change of direction of wave-signal propagation by an angle equal to that between the portions 47 and 48 of the wave guide 45. The path of wave-signal propagation along the wave guide is thus that indicated by the broken line.

When the mode of propagation of the electromagnetic wave is such that the magnetic field of the wave is parallel to the median plane of the wave guide including the angled turn, the laminations of the translating element 46 are also parallel to the median plane, as indicated in Fig. 7a. However, when the mode of wave-signal propagation is such that the electric field of the wave signal is parallel to the median plane of the wave guide including the angled turn, as in Fig. 7b, the laminations of the element 46' are normal to the median plane, as indicated in Fig. 7b. It will be understood that the quantities of dielectric and magnetic materials of the translating elements 46, 46' and 49 are proportioned in the manner explained in connection with Figs. 1 and 1a to ensure constant impedance to wave-signal propagation through the wave guide. The design of the translating elements 46, 46' and 49 involve the same considerations that apply to the design of a light-refractive prism, the index of refraction being given by Equation 5 above.

It will be apparent from the above description of the invention that a high-frequency electromagnetic-wave translating arrangement embodying the invention possesses high efficiency of wave-signal propagation particularly in that minimum reflection of wave-signal energy occurs at the boundary surfaces of any wave-signal translating elements used therein and lying in the path of wave-signal propagation. A translating arrangement embodying the invention has the additional advantage that the velocity of wave-signal propagation through wave-signal translating elements employed therein may have any value within a substantial range of values determined by the choice of the dielectric and magnetic materials of such elements. This feature is of importance where it is necessary to attain a desired value of increase of effective electrical length of a wave-signal propagation path provided by the arrangement for a given physical length thereof or to effect a desired value of index of refraction where it is desired that at least one surface of a translating element employed therein effect a change of direction of a propagated wave signal.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A high-frequency electromagnetic-wave translating arrangement comprising, a wave-signal propagating device adapted to effect propagation of high-frequency electromagnetic waves along a predetermined propagation path of which at least a portion of the propagation medium thereof has a predetermined ratio of dielectric constant to magnetic permeability, and an electromagnetic-wave propagating element interposed in said portion of said path to modify the velocity of wave-signal propagation therethrough, said element including dielectric and magnetic materials individually having a substantially different dielectric constant and a substantially different magnetic permeability than said medium of said path but combined in quantities so proportioned with relation to their dielectric constants and magnetic permeabilities as to provide, for a predetermined mode of wave-signal propagation therethrough and along said portion of said path, a ratio of effective dielectric constant to effective magnetic permeability for said element substantially equal to said predetermined ratio.

2. A high-frequency electromagnetic-wave translating arrangement comprising, a wave-signal propagating device adapted to effect propagation of high-frequency electromagnetic waves along a predetermined propagation path of which at least a portion of the propagation medium thereof has a predetermined ratio of dielectric constant to magnetic permeability, and an electromagnetic-wave propagating element interposed in said portion of said path to modify the velocity of wave-signal propagation therethrough, said element including dielectric and magnetic materials having unequal dielectric constants and magnetic permeabilities and individually having a substantially different dielectric constant and a substantially different magnetic permeability than said medium of said path but combined in quantities so proportioned with relation to their individual dielectric constants and magnetic permeabilities as to provide, for a predetermined mode of wave-signal propagation therethrough and along said portion of said path, a ratio of effective dielectric constant to effective magnetic permeability for said element substantially equal to said predetermined ratio.

3. A high-frequency electromagnetic-wave translating arrangement comprising, a wave-signal propagating device adapted to effect propagation of high-frequency electromagnetic waves along a predetermined propagation path of which at least a portion of the propagation medium thereof has a predetermined ratio of dielectric constant to magnetic permeability, and an electromagnetic-wave propagating element interposed in said portion of said path to modify the velocity of wave-signal propagation therethrough, said element including dielectric material having a predetermined dielectric constant and unit magnetic permeability and a magnetic material having a predetermined dielectric constant and predetermined magnetic permeability, said materials individually having a substantially different dielectric constant and a substantially different magnetic permeability than said medium of said path but being combined in quantities so proportioned with relation to their dielectric constants and magnetic permeabilities as to provide, for a predetermined mode of wave-signal propagation therethrough and along said portion of said path, a ratio of effective dielectric constant to effective magnetic permeability for said element substantially equal to said predetermined ratio.

4. A high-frequency electromagnetic-wave translating arrangement comprising, a wave-signal propagating device adapted to effect propagation of high-frequency electromagnetic waves along a predetermined propagation path of which at least a portion of the propagation medium thereof has a predetermined ratio of dielectric constant to magnetic permeability, and an electromagnetic-wave propagating element interposed in said portion of said path to modify the velocity of wave-signal propagation therethrough, said element including dielectric material and particles of magnetic material dispersed in at least a portion of said dielectric material, said materials individually having a substantially different dielectric constant and a substantially different magnetic permeability than said medium of said path but being combined in quantities so proportioned with relation to their dielectric constants and magnetic permeabilities as to provide, for a predetermined mode of wave-signal propagation therethrough and along said portion of said path, a ratio of effective dielectric constant to effective magnetic permeability for said element substantially equal to said predetermined ratio.

5. A high-frequency electromagnetic-wave translating arrangement comprising, a wave-signal propagating device adapted to effect propagation of high-frequency electromagnetic waves along a predetermined propagation path of which at least a portion of the propagation medium thereof has a predetermined ratio of dielectric constant to magnetic permeability, and an electromagnetic-wave propagating element interposed in said portion of said path to modify the velocity of wave-signal propagation therethrough, said element including dielectric material and comminuted magnetic material held in solid suspension in at least a portion of said dielectric material, said materials individually having a substantially different dielectric constant and a substantially different magnetic permeability than said medium of said path but being combined in quantities so proportioned with relation to their dielectric constants and magnetic permeabilities as to provide, for a predetermined mode of wave-signal propagation therethrough and along said portion of said path, a ratio of effective dielectric constant to effective magnetic permeability for said element substantially equal to said predetermined ratio.

6. A high-frequency electromagnetic-wave translating arrangement comprising, a wave-signal propagating device adapted to effect propagation of high-frequency electromagnetic waves along a predetermined propagation path of which at least a portion of the propagation medium thereof has a predetermined ratio of dielectric constant to magnetic permeability, and an electromagnetic-wave propagating element interposed in said portion of said path to modify the velocity of wave-signal propagation therethrough, said element including dielectric material and comminuted magnetic material held in solid suspension in at least a portion of said dielectric material, said materials individually having a substantially different dielectric constant and a substantially different magnetic permeability than said medium of said path but the configuration of said element and the proportioned quantities of said materials being such as to provide, for a predetermined mode of wave-signal propagation therethrough and along said portion of said path, a ratio of effective dielectric constant to effective magnetic permeability for said element substantially equal to said predetermined ratio.

7. A high-frequency electromagnetic-wave translating arrangement comprising, a wave-signal propagating device adapted to effect propagation of high-frequency electromagnetic waves along a predetermined propagation path of which at least a portion of the propagation medium thereof has a predetermined ratio of dielectric constant to magnetic permeability, and an electromagnetic-wave propagating element interposed in said portion of said path to modify the velocity of wave-signal propagation therethrough, said element including dielectric material and particles of magnetic material dispersed in said dielectric material, said particles of magnetic material having a maximum dimension less than one-tenth the wave length of said wave signal and said materials individually having a substantially different dielectric constant and a substantially different magnetic permeability than said medium of said path but being combined in quantities so proportioned with relation to their dielectric constants and magnetic permeabilities as to provide, for a predetermined mode of wave-signal propagation therethrough and along said portion of said path, a ratio of effective dielectric constant to effective magnetic permeability for said element substantially equal to said predetermined ratio.

8. A high-frequency electromagnetic-wave translating arrangement comprising, a wave-signal propagating device adapted to effect propagation of high-frequency electromagnetic waves along a predetermined propagation path of which at least a portion of the propagation medium thereof has a predetermined ratio of dielectric constant to magnetic permeability, and an electromagnetic-wave propagating element interposed in said portion of said path to modify the velocity of wave-signal propagation therethrough, said element including at least one layer of dielectric material and at least one continuous layer of magnetic material, said materials individually having a substantially different dielectric constant and a substantially different magnetic permeability than said medium of said path but being combined in quantities so proportioned with relation to their dielectric constants and magnetic permeabilities as to provide, for a predetermined mode of wave-signal propagation therethrough and along said portion of said path, a ratio of effective dielectric constant to effective magnetic permeability for said element substantially equal to said predetermined ratio.

9. A high-frequency electromagnetic-wave translating arrangement comprising, a wave-signal propagating device adapted to effect propagation of high-frequency electromagnetic waves along a predetermined propagation path of which at least a portion of the propagation medium thereof has a predetermined ratio of dielectric constant to magnetic permeability, and an electromagnetic-wave propagating element interposed in said portion of said path to modify the velocity of wave-signal propagation therethrough, said element including a plurality of layers alternately of dielectric material and individually insulated particles of magnetic material, said materials individually having a substantially different dielectric constant and a substantially different magnetic permeability than said medium of said path but being combined in quantities so proportioned with relation to their dielectric constants and magnetic permeabilities as to provide, for a predetermined mode of wave-signal propagation therethrough and along said portion of said path, a ratio of effective dielectric constant to effective magnetic permeability for said element substantially equal to said predetermined ratio.

10. A high-frequency electromagnetic-wave translating arrangement comprising, a wave-signal propagating device adapted to effect propagation of high-frequency electromagnetic waves along a predetermined propagation path of which at least a portion of the propagation medium thereof has a predetermined ratio of dielectric constant to magnetic permeability, and an electromagnetic-wave propagating element interposed in said portion of said path to modify the velocity of wave-signal propagation therethrough, said elements including laminations alternately of dielectric and magnetic materials individually having a substantially different dielectric constant and a substantially different magnetic permeability than said medium of said path but having maximum lamination thickness much less than one radian length and combined in quantities so proportioned with relation to their dielectric constants and magnetic permeabilities as to provide, for a predetermined mode of wave-signal propagation therethrough and along said portion of said path, a ratio of effective dielectric constant to effective magnetic permeability for said element substantially equal to said predetermined ratio.

11. A high-frequency electromagnetic-wave translating arrangement comprising, a wave-signal propagating device adapted to effect propagation of high-frequency electromagnetic waves along a predetermined propagation path of which at least a portion of the propagation medium thereof has a predetermined ratio of dielectric constant to magnetic permeability, and an electromagnetic-wave propagating element interposed in said portion of said path to modify the velocity of wave-signal propagation therethrough, said element including dielectric and magnetic materials individually having a substantially different dielectric constant and a substantially different magnetic permeability than said medium of said path but combined in quantities so proportioned with relation to their dielectric constants and magnetic permeabilities and having such configuration of said element in a cross section normal to the direction of wave-signal propagation therethrough as to provide, for said direction of wave-signal propagation and for a predetermined mode of wave-signal propagation therethrough, a ratio of effective dielectric constant to effective magnetic permeability for said element substantially equal to said predetermined ratio.

12. A high - frequency electromagnetic - wave translating arrangement comprising, a wave-signal propagating device adapted to effect propagation of high-frequency electromagnetic waves along a predetermined propagation path of which at least a portion of the propagation medium thereof has a predetermined ratio of dielectric constant to magnetic permeability, and an electromagnetic-wave propagating element interposed in said portion of said path to modify the velocity of wave-signal propagation therethrough, said element including dielectric and magnetic materials individually having a substantially different dielectric constant and a substantially different magnetic permeability than said medium of said path but combined in quantities so proportioned with relation to their dielectric constants and magnetic permeabilities as to provide, for a predetermined mode of wave-signal propagation therethrough and for an elementary unit volume of said combined materials, a predetermined dielectric constant and a smaller magnetic permeability, said element having such a configuration in a cross section normal to the direction of wave-signal propagation therethrough as to provide along said portion of said path a ratio of effective dielectric constant to effective magnetic permeability for said element substantially equal to said predetermined ratio.

13. A high - frequency electromagnetic - wave translating arrangement comprising, a wave-signal propagating device adapted to effect propagation of high-frequency electromagnetic waves along a predetermined propagation path of which at least a portion of the propagation medium thereof has a predetermined ratio of dielectric constant to magnetic permeability, and an electromagnetic-wave propagating element interposed in said portion of said path to modify the velocity of wave-signal propagation therethrough, said element including dielectric and magnetic materials individually having a substantially different dielectric constant and a substantially different magnetic permeability than said medium of said path but combined in quantities so proportioned with relation to their dielectric constants and magnetic permeabilities as to provide, for a predetermined mode of wave-signal propagation therethrough and along said portion of said path, a ratio of effective dielectric constant to effective magnetic permeability for said element substantially equal to said predetermined ratio, the boundary surfaces of said element in the path of wave-signal propagation having such configurations and orientations relative to the direction of wave propagation as to enable said element to change the direction of wave-signal propagation from one side of said element to the other by refraction.

14. A high - frequency electromagnetic - wave translating arrangement comprising, a wave-signal propagating device adapted to effect propagation of high-frequency electromagnetic waves along a predetermined propagation path of which at least a portion of the propagation medium thereof has a predetermined ratio of dielectric constant to magnetic permeability, and an electromagnetic-wave propagating element interposed in said portion of said path to modify the velocity of wave-signal propagation therethrough, said element including dielectric and magnetic materials individually having a substantially different dielectric constant and a substantially different magnetic permeability than said medium of said path but combined in quantities so proportioned with relation to their dielectric constants and magnetic permeabilities as to provide, for a predetermined mode of wave-signal propagation therethrough and along said portion of said path, a ratio of effective dielectric constant to effective magnetic permeability for said element substantially equal to said predetermined ratio, at least one of the boundary surfaces of said element in the path of wave-signal propagation having such configuration as to modify the concentration of electromagnetic energy along said path.

15. A high - frequency electromagnetic - wave translating arrangement comprising, a wave-signal propagating device having spaced opposing conductive surfaces adapted to effect propagation of high-frequency electromagnetic waves along a propagation path between said surfaces of which path at least a portion of the propagation medium thereof has a predetermined ratio of dielectric constant to magnetic permeability, and an electromagnetic-wave propagating element interposed between said surfaces in said portion of said path to modify the velocity of wave-signal propagation therethrough, said element including dielectric and magnetic materials individually having a substantially different dielectric constant and a substantially different magnetic permeability than said medium of said path but combined in quantities so proportioned with relation to their dielectric constants and magnetic permeabilities as to provide, for a predetermined mode of wave-signal propagation therethrough and along said portion of said path, a ratio of effective dielectric constant to effective magnetic permeability for said element substantially equal to said predetermined ratio.

16. A high-frequency electromagnetic-wave translating arrangement comprising, a wave-signal propagating device having spaced opposing conductive surfaces adapted to effect propagation of high-frequency electromagnetic waves along a propagation path between said surfaces of which path at least a portion of the propagation medium thereof has a predetermined ratio of dielectric constant to magnetic permeability, and an electromagnetic-wave propagating element interposed in said portion of said path and between said surfaces partially to fill the space therebetween for modifying the velocity of wave-signal propagation through said portion of said path, said element including dielectric and magnetic materials individually having a substantially different dielectric constant and a substantially different magnetic permeability than said medium of said path but combined in quantities so proportioned with relation to their dielectric constants and magnetic permeabilities as to provide, for a predetermined mode of wave-signal propagation therethrough and along said portion of said path, a ratio of effective dielectric constant to effective magnetic permeability for said element substantially equal to said predetermined ratio.

17. A high - frequency electromagnetic - wave translating arrangement comprising, a wave-signal propagating device having spaced opposing conductive surfaces adapted to effect propagation of high-frequency electromagnetic waves along a propagation path between said surfaces of which path at least a portion of the propagation medium thereof has a predetermined ratio of dielectric constant to magnetic permeability, and an electromagnetic-wave propagating element interposed in said portion of said path to modify the velocity of wave-signal propagation therethrough, said element including at least one layer of dielectric material and at least one contiguous layer of magnetic material, said materials individually having a substantially different dielectric constant and a substantially different magnetic permeability than said medium of said path but being combined in quantities so proportioned with relation to their dielectric constants and magnetic permeabilities as to provide between said surfaces, for a predetermined mode of wave-signal propagation through said element and along said portion of said path, a ratio of effective dielectric constant to effective magnetic permeability for said element substantially equal to said predetermined ratio.

18. A high - frequency electromagnetic - wave translating arrangement comprising, a wave-signal propagating device having spaced concentric conductive surfaces adapted to effect propagation of high-frequency electromagnetic waves along a propagation path between said surfaces of which path at least a portion of the propagation medium thereof has a predetermined ratio of dielectric constant to magnetic permeability, and an electromagnetic-wave propagating element interposed in said portion of said path to modify the velocity of wave-signal propagation therethrough, said element including dielectric and magnetic materials individually having a substantially different dielectric constant and a substantially different magnetic permeability than said medium of said path but combined in quantities so proportioned with relation to their dielectric constants and magnetic permeabilities as to provide, for a predetermined mode of wave-signal propagation therethrough and along said portion of said path, a ratio of effective dielectric constant to effective magnetic permeability for said element substantially equal to said predetermined ratio.

19. A high-frequency electromagnetic-wave translating arrangement comprising, a wave-signal propagating device having spaced concentric conductive surfaces adapted to effect propagation of high-frequency electromagnetic waves along a propagation path between said surfaces of which path at least a portion of the propagation medium thereof has a predetermined ratio of dielectric constant to magnetic permeability, and an electromagnetic-wave propagating element interposed in said portion of said path to modify the velocity of wave-signal propagation therethrough and including dielectric and magnetic materials individually having a substantially different dielectric constant and a substantially different magnetic permeability than said medium of said path but combined in quantities so proportioned with relation to their dielectric constants and magnetic permeabilities as to provide for said combined materials a predetermined dielectric constant and a predetermined magnetic permeability, said element having a first portion enclosing the inner one of said surfaces to provide a closed magnetic path around said inner surface and other portions radiating from said first portion to the outer one of said surfaces, the effective radial thickness of said first portion of said element being proportioned with relation to the length and cross-sectional areas of said other portions normal to the direction of wave-signal propagation through said element to provide between said surfaces, for a predetermined mode of wave-signal propagation through said element, a ratio of effective dielectric constant to effective magnetic permeability for said element substantially equal to said predetermined ratio.

20. A high-frequency electromagnetic-wave translating arrangement comprising, a wave-signal propagating device having spaced concentric conductive surfaces adapted to effect propagation of high-frequency electromagnetic waves along a propagation path between said surfaces of which path at least a portion of the propagation medium thereof has a predetermined ratio of dielectric constant to magnetic permeability, and an electromagnetic-wave propagating element interposed in said portion of said path to modify the velocity of wave-signal propagation therethrough and including dielectric and magnetic materials having predetermined dielectric constants and magnetic permeabilities and individually having a substantially different dielectric constant and a substantially different magnetic permeability than said medium of said path, said element having at least one hub portion surrounding the inner one of said conductive surfaces to provide a closed magnetic path around said inner surface and radial fin portions extending from said hub portion to at least the outer one of said conductive surfaces, the quantities of said dielectric and magnetic materials and the cross sections of said element portions normal to the direction of wave-signal propagation through said element being proportioned to provide between said surfaces, for a predetermined mode of wave-signal propagation through said element and along said portion of said path, a ratio of effective dielectric constant to effective magnetic permeability for said element substantially equal to said predetermined ratio.

21. A high-frequency electromagnetic-wave translating arrangement comprising, a wave-signal propagating device having spaced concentric conductive surfaces adapted to effect propagation of high-frequency electromagnetic waves along a propagation path between said surfaces of which path at least a portion of the propagation medium thereof has a predetermined ratio of dielectric constant to magnetic permeability, and an electromagnetic-wave propagating element interposed in said portion of said path to modify the velocity of wave-signal propagation therethrough and including dielectric and magnetic materials individually having a substantially different dielectric constant and a substantially different magnetic permeability than said medium of said path but combined in quantities so proportioned with relation to their dielectric constants and magnetic permeabilities as to provide a predetermined dielectric constant and a smaller predetermined magnetic permeability, said element providing a closed magnetic path around the inner one of said surfaces and providing radial paths between said surfaces of such length and cross-sectional area transverse to the direction of wave-signal propagation through said element as to provide between said surfaces, for a predetermined mode of wave-signal propagation through said element and along said portion of said path, a ratio of effective dielectric constant to effective magnetic permeability for said element substantially equal to said predetermined ratio.

22. A high-frequency electromagnetic-wave translating arrangement comprising, a wave-signal propagating device having spaced concentric conductive surfaces adapted to effect propagation of high-frequency electromagnetic waves along a propagation path between said surfaces of which path at least a portion of the propagation medium thereof has a predetermined ratio of dielectric constant to magnetic permeability, and an electromagnetic-wave propagating element interposed in said portion of said path to modify the velocity of wave-signal propagation therethrough and including at least two concentric layers of material surrounding the inner one of said conductive surfaces, one of said layers being of dielectric material and the other of magnetic material and said materials individually having a substantially different dielectric constant and a substantially different magnetic permeability than said medium of said path but being combined in quantities so proportioned with relation to their dielectric constants and magnet c permeabilities as to provide between said surfaces, for a predetermined mode of wave-signal propagation through said element and along said portion of said path, a ratio of effective dielectric constant to effective magnetic permeability for said element substantially equal to said predetermined ratio.

23. A high-frequency electromagnetic-wave translating arrangement comprising, a wave-signal propagating device having spaced concentric conductive surfaces adapted to effect propagation of high-frequency electromagnetic waves along a propagation path between said surfaces of which path at least a portion of the propagation medium thereof has a predetermined ratio of dielectric constant to magnetic permeability, and an electromagnetic-wave propagating element interposed in said portion of said path to modify the velocity of wave-signal propagation therethrough and including concentric cylindrical laminations of material surrounding the inner one of said conductive surfaces, said laminations of material being alternatively of dielectric and magnetic materials individually having a substantially different dielectric constant and a substantially different magnetic permeability than said medium of said path but combined in quantities so proportioned with relation to their dielectric constants and magnetic permeabilities as to provide between said surfaces, for a predetermined mode of wave-signal propagation through said element and along said portion of said path, a ratio of effective dielectric constant to effective magnetic permeability for said element substantially equal to said predetermined ratio.

HAROLD A. WHEELER.

REFERENCES CITED

The following references are of record in the file of this patent:

UNITED STATES PATENTS

| Number | Name | Date |
|---|---|---|
| 2,228,798 | Wassermann | Jan. 14, 1941 |
| 2,320,313 | Thomas et al. | May 25, 1943 |